United States Patent
Kim et al.

(10) Patent No.: US 11,874,717 B2
(45) Date of Patent: Jan. 16, 2024

(54) PSU CONTROL BASED ON PSU TEMPERATURE

(71) Applicant: Microsoft Technology Licensing, LLC, Redmond, WA (US)

(72) Inventors: Donghwi Kim, Kirkland, WA (US); Timothy Jakoboski, Woodinville, WA (US); Chee Kiong Fong, Saratoga, CA (US); Manish Shah, Redmond, WA (US); Suet Fong Tin, Redmond, WA (US); Geoffrey Shew, Redmond, WA (US); Gregory Allen Nielsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/667,935

(22) Filed: Feb. 9, 2022

(65) Prior Publication Data
US 2023/0251700 A1 Aug. 10, 2023

(51) Int. Cl.
*G06F 1/32* (2019.01)
*G06F 1/3206* (2019.01)
(Continued)

(52) U.S. Cl.
CPC ............ *G06F 1/3206* (2013.01); *G06F 1/206* (2013.01); *G06F 1/3296* (2013.01)

(58) Field of Classification Search
None
See application file for complete search history.

(56) References Cited

U.S. PATENT DOCUMENTS

| 6,911,808 B1 | 6/2005 | Shimamori |
| 8,751,849 B2 | 6/2014 | Conroy et al. |

(Continued)

FOREIGN PATENT DOCUMENTS

| CN | 210350834 U | 4/2020 |
| CN | 111130090 A | 5/2020 |
| JP | 5042396 B2 | 7/2012 |

OTHER PUBLICATIONS

"Develop a Dallas 1-Wire® Master Using the Z8F1680 Series of MCUs", Retrieved From: https://www.zilog.com/docs/appnotes/an0331.pdf, Nov. 26, 2021, 13 Pages.
(Continued)

*Primary Examiner* — Danny Chan
(74) *Attorney, Agent, or Firm* — Holzer Patel Drennan (57) ABSTRACT

The described technology provides an apparatus including a power supply unit (PSU) and a PSU control system stored in the memory and executable by the one or more processor units, the PSU control system encoding computer-executable instructions on the memory for executing on the one or more processor units a computer process, the computer process including receiving internal temperatures of the PSU over a duration of time, determining multiple exponential weighted moving average (EWMAs) of the internal temperature of the PSU for the duration of time, comparing the EWMA with a temperature threshold associated with the duration of time, and based at least in part on determining that EWMA exceeds the temperature threshold associated with the duration of time, limiting the output power of a charger using a charger current limit input to the charger. In an alternative implementation of the technology disclosed herein, the computer process includes receiving an initial condition of the PSU such as sensed PSU power level for a duration of time, determining multiple EWMA of the sensed PSU power level for the duration of time, comparing the
(Continued)

EWMA with a sensed power level threshold associated with the duration of time, and based at least in part on determining that EWMA exceeds the sensed power level threshold associated with the duration of time, limiting the output power of a charger using a charger current limit input to the charger.

18 Claims, 8 Drawing Sheets

(51) Int. Cl.
*G06F 1/20* (2006.01)
*G06F 1/3296* (2019.01)

(56) References Cited

U.S. PATENT DOCUMENTS

| | | | |
|---|---|---|---|
| 9,323,320 | B2 | 4/2016 | Fitzpatrick et al. |
| 9,500,535 | B1 | 11/2016 | Urban et al. |
| 9,791,902 | B2 | 10/2017 | Ragupathi et al. |
| 9,866,134 | B2 | 1/2018 | Kha |
| 2014/0253047 | A1* | 9/2014 | Horie ............ H02J 7/00 320/150 |
| 2014/0331067 | A1* | 11/2014 | Chen ............ H02J 7/0047 713/320 |
| 2015/0194969 | A1* | 7/2015 | Kawabe ............ G06F 1/3243 327/114 |
| 2015/0277461 | A1 | 10/2015 | Anderson et al. |
| 2015/0346792 | A1* | 12/2015 | Rathi ............ G06F 1/26 713/310 |
| 2017/0285700 | A1 | 10/2017 | Cartagena et al. |
| 2017/0293344 | A1* | 10/2017 | Troberg ............ H02J 7/007 |
| 2018/0067507 | A1 | 3/2018 | Nielsen et al. |
| 2020/0174540 | A1* | 6/2020 | Takatori ............ G06F 1/28 |
| 2020/0310505 | A1* | 10/2020 | Suzuki ............ G06F 1/28 |
| 2021/0048870 | A1* | 2/2021 | Lin ............ G06F 1/3206 |

OTHER PUBLICATIONS

"Introduction to Richtek USB Type C Power Delivery Solutions", Retrieved From: https://web.archive.org/web/20171024042839/https:/www.richtek.com/Design%20Support/Technical%20Document/AN056, Oct. 24, 2017, 13 Pages.

Patnaik, et al., "A Closed-Loop Constant-Temperature Constant-Voltage Charging Technique to Reduce Charge Time of Lithium-Ion Batteries", In Journal of IEEE Transactions on Industrial Electronics, vol. 66, Issue 2, Feb. 2019, pp. 1059-1067.

"International Search Report and Written Opinion Issued in PCT Application No. PCT/US22/051027", dated Mar. 16, 2023, 16 Pages.

* cited by examiner

PSU CONTROL BASED ON PSU TEMPERATURE

BACKGROUND

Power supplies for desktop and mobile PCs contribute significantly to the overall size, heat, and noise of a system. For example, a typical desktop PC intended for office includes a 250 W-300 W power supply (PSU). However, the actual power drawn by the system while running normal office desktop applications is typically 70-150 W, including a power supply loss of approximately 10-30%. If a PC could be delivered with, for example, a 150 W power supply, this would represent a saving in cost for the manufacturer, and a reduction in overall size of the power supply enabling smaller PCs. A PSU is typically set to a fixed power rating across a wide operating range. For example, PSU power rate on certain laptop devices may be limited to a static fixed power rating. e.g. 60 W, 95 W, 120 W, etc.

SUMMARY

The described technology provides an apparatus including a power supply unit (PSU) and a PSU control system stored in the memory and executable by the one or more processor units, the PSU control system encoding computer-executable instructions on the memory for executing on the one or more processor units a computer process, the computer process including receiving internal temperatures of the PSU over a duration of time, determining multiple exponential weighted moving average (EWMAs) of the internal temperature of the PSU for the duration of time, comparing the EWMAs with temperature thresholds associated with the duration of time, and based at least in part on determining that an EWMA exceeds the temperature threshold associated with the duration of time, limiting the output power of a charger using a charger current limit input to the charger. In an alternative implementation of the technology disclosed herein, the computer process includes receiving an initial condition of the PSU such as sensed PSU power level for a duration of time, determining multiple EWMA of the sensed PSU power level for the duration of time, comparing the EWMAs with sensed power level thresholds associated with the duration of time, and based at least in part on determining that an EWMA exceeds the sensed power level threshold associated with the duration of time, limiting the output power of a charger using a charger current limit input to the charger.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The technology disclosed herein includes a power supply unit (PSU) system where the power rating of the PSU is controlled dynamically. In some implementations disclosed herein, the power rating of the PSU may be controlled based at least in part on an algorithm. Generally, a PSU is set to a fixed power rating across a wide operating range. For example, PSU power rate on certain laptop devices may be limited to a static fixed power rating. e.g. 60 W, 95 W, 120 W, etc. For some power supplies, it may be possible to opportunistically draw more power than the specified static fixed power rating, but that exceedance needs to be constrained to actual load levels, durations at those load levels, PSU internal status, and the PSU internal temperature. An average of the PSU internal temperature or initial PSU status at plug-in can be used as a good proxy for identifying the max load the PSU can handle at a given time.

An implementation of the system disclosed herein provides an architecture and a method to control a power supply unit (PSU) to allow adjustment of the output power that the PSU can supply. Implementations disclosed herein use a variety of factors to control the output power the PSU can supply for periods of time and make downward adjustments to the output power the PSU can supply if at least some of the multiple factors are exceeded. An implementation of the technique for making adjustments over time to the PSU output power makes use of the measured temperature of the PSU, the limits of current that can be supplied by the PSU, and the amount of time that the PSU operates at or above various temperature thresholds. Another implementation of the technique for adjusting over time the PSU output power makes use of the initial PSU power level at start up, the limits of current that can be supplied by the PSU, and a set of time limits for the amount of time that the average power supplied at various levels can be supplied by the PSU. Adjusting PSU output power levels based at least in part on initial PSU power level at start up or the PSU internal temperature mitigates the stress level on the PSU while still providing higher PSU output power levels to device components.

The implementations disclosed herein provide benefits over the prior PSU control systems by achieving opportunistic higher PSU power ratings without violating reliable time duration specification of the PSUs. As a result, the implementations disclosed herein greatly enhances burst performance of various processors, such as CPUs, GPUs, etc., of various computing devices. Another benefit of the disclosed implementations is that they allow to prevent plug-in not charging (PINC) episodes for the computing devices. Additionally, when compared to the prior methods of limiting charger current limits to a fixed level, which required processor to be throttled to keep the fixed PSU power rate, the implementations disclosed herein requires less processor throttling. This is very beneficial for application, such as gaming where using the system disclosed herein, higher frame-per-second (FPS) rate are possible from higher PSU power rating than prior fixed levels with less component throttling, but still within time-duration based limits at the various PSU power ratings.

Figure 1:
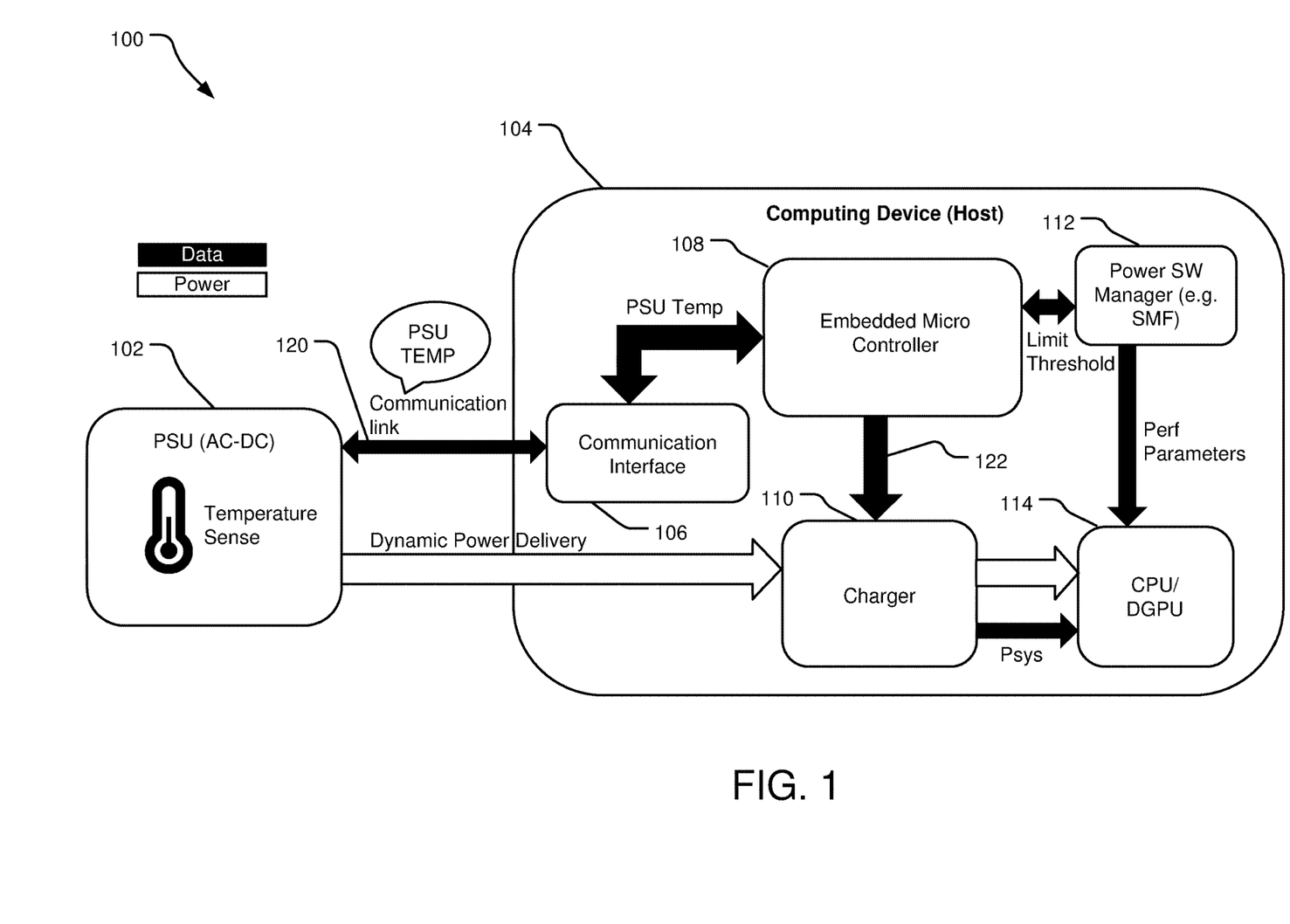
FIG. 1 illustrates a computing system including a PSU control system that adjusts output power based at least in part on measured temperature of the PSU.

FIG. 1 illustrates a PSU control system 100 that adjusts output power based at least in part on measured temperature of a PSU 102. The PSU control system 100 may be implemented on a computing device 104. In the illustrated implementation, the PSU control system 100 includes a communication link 120 that communicates between the PSU 102 and a communication interface 106 of the computing device 104. For example, the communication interface 106 may be a USB Type C power delivery (USBC PD) controller or a Microsoft Surflink™ communication interface. The communication link 120 may be used to measure temperature of the PSU 102. The PSU 102 may provide power to a charger 110 of the computing device 104.

The communication interface 106 may communicate the PSU temperature to an embedded microcontroller 108. The embedded microcontroller 108 may be configured to implement one or more algorithms for averaging temperature of the PSU over different time durations and to dynamically generate a charger current limit 122. The charger current limit 122 may be communicated as an input to a charger 110 that provides current to a processor 114. For example, the processor 114 may be a CPU of the device 104, a dedicated GPU (DGPU) of the device 104, etc.

Furthermore, the embedded microcontroller 108 may also generate a limit threshold based at least in part on the PSU temperature and a timer and communicate the limit threshold to a processor power software manager. An example of the processor power software manager may be Microsoft™ Systems Management Framework (SMF) 112. In one implementation, the SMF 112 use the limit thresholds to generate performance parameters, such as system and component level power caps, for the processor 314 that may throttle performance of the processor 314.

In one implementation, the embedded microcontroller 108 may receive and store the temperature of the PSU 102 over various time durations and generate exponential weighted moving averages (EWMAs) of the internal temperature of the PSU 102 for the various time durations. For example, the embedded controller 108 may generate EWMAs of the internal temperature of the PSU 102 over rolling durations of 0.1 hours, 0.2 hours, 0.3 hours, 0.5 hours, 1 hour, 1.5 hours, etc. In one implementation, the embedded microcontroller 108 may generate the EWMA as exponential EWMA for various time durations using the equation I provided below:

$$EWMA_t = EWMA_{t-1} + \Delta t/\tau * (I_t - EWMA_{t-1}) \quad \text{I}$$

Here $EWMA_t$ is the EWMA at time t, $EWMA_{t-1}$ is the EWMA at time t−1, $I_t$ is the internal temperature of the PSU 102 received from the communication interface 106 for time t, Δt is the time elapsed between t−1 and t, and τ is a uniquely designed time constant per each EWMA related to the average. For example, τ may be 30 seconds, 60 seconds, 90 seconds, etc. Using the WMA or the EWMA and comparing them to thresholds makes the operations disclosed herein avoid unnecessarily setting target load maximum flag in response to transient changes in PSU conditions, such as transient changes in PSU internal temperature, etc. This results in smoother operation for managing the power output level of the PSU.

Furthermore, the embedded microcontroller 108 may also store a lookup table that stores EWMA output levels related to various time durations and EWMA thresholds for the PSU 102. For example, if the calculated EWMA for Δt of 0.1 hours is above 110 centigrade (C), the EWMA output level may be 15, which relates to current limit to the charger 110 of 1.5×. Similarly, if the calculated EWMA for Δt of 0.2 hours is above 100 centigrade (C), the EWMA output level may be 14, which relates to current limit to the charger 110 of 1.4×. Such dynamic current limit to the charger 110 allows the maximum power that can be applied to the processor 114 to be increased opportunistically or dynamically based at least in part on the internal temperature of the PSU 102. This provides a potential for faster charging of the device 104 and allows providing performance boost to the processor 114 and other peripherals (such as USB-C) of the device 104.

An example relations between the maximum time durations Δt, EWMA temperature thresholds, the EWMA output levels, and the charger limit ILIM1 that determines the PSU power threshold is illustrated by the lookup Table I that may be stored in a memory of the embedded microcontroller 108. In one implementation, the maximum time duration and PSU power threshold (charger current ILIM1) are also designed by PSU reliability guideline and thermal design in PSU.

LOOKUP TABLE I

| EWMA Output Level | Maximum Duration (Hours) | EWMA PSU Temp Threshold | PSU Power Threshold (Charger Current ILIM1) |
|---|---|---|---|
| 16 | N/A | All EWMA < Thresholds | 1.6× |
| 15 | 0.1 | 110 C. | 1.5× |
| 14 | 0.2 | 100 C. | 1.4× |
| 13 | 0.3 | 90 C. | 1.3× |
| 12 | 0.5 | 80 C. | 1.2× |
| 11 | 1.5 | 70 C. | 1.15× |
| 10 | Sustaining | 60 C. | 1× |

Specifically, Lookup Table I illustrates using calculations of various EWMA based at least in part on internal PSU temperature to dynamically adjust the PSU maximum power. Each EWMA has a unique time constant, referred to as Tau (τ). During the operation, each individual EWMA for various Taus is correlated with a different PSU internal temperature limit. For example, the EWMA for 60 second τ corresponds with an 80 C temperature limit and 1.2× PSU rating. Another EWMA for 30 second τ may correspond with 70 C temperature limit and 1.1× PSU rating.

Once one of the multiple simultaneously calculated EWMA reaches corresponding temperature limit associated with a PSU power rating threshold, a target maximum flag is sent to a software or hardware control algorithm. Thus, for example, if the EWMA calculated for 60 second r reaches 80 C such target maximum flag is sent to a software or hardware control algorithm. In response, the control algorithm throttles back the components in the platform such as CPU, DGPU, etc., to hold the desired PSU rating, in this case 1.2× PSU rating. Subsequently, when any of the EWMAs, for example, the EWMA for 30 second T reaches 70 C, another flag is sent to the control algorithm and in response, the control algorithm further throttles back the components in the platform such as CPU, DGPU, etc., to hold the desired PSU rating, in this case 1.1× PSU rating.

This implementation allows for a gradual step-down approach to limit PSU power rating. Specifically, in order for the higher PSU power rating to be available again requires operation periods at lower power level (i.e. lower PSU temperature) to give the EWMAs time to reduce in their value. The disclosed implementations allow dynamically using higher PSU ratings for applications like games where higher frame-per-second (FPS) rate may be provided using higher PSU power rating than prior fixed PSU rating levels with less component throttling, but still within time-duration based limits at the various PSU power rating.

The EWMA PSU temperature thresholds provided herein may be determined either theoretically and/or empirically during the manufacturing stage of the device 104. The embedded controller 108 may calculate the actual EWMA for a various time durations as per equation 1 above on a rolling basis and compare the calculated EWMA to the EWMA PSU temperature thresholds to determine the EWMA output level and the PSU power threshold charger current ILIM1. Thus, for example, if all calculated EWMAs are less than their associated EWMA PSU temperature thresholds, then the EWMA output level is 16, corresponding to charger current ILIM1 to the charger 110 of 1.6×, thus providing higher PSU output level to the processor 114. Similarly, if the calculated EWMA for the time period of 0.1 hours is greater than 110 C, then the EWMA output level is 15, corresponding to charger current ILIM1 to the charger 110 of 1.5×.

Figure 2:
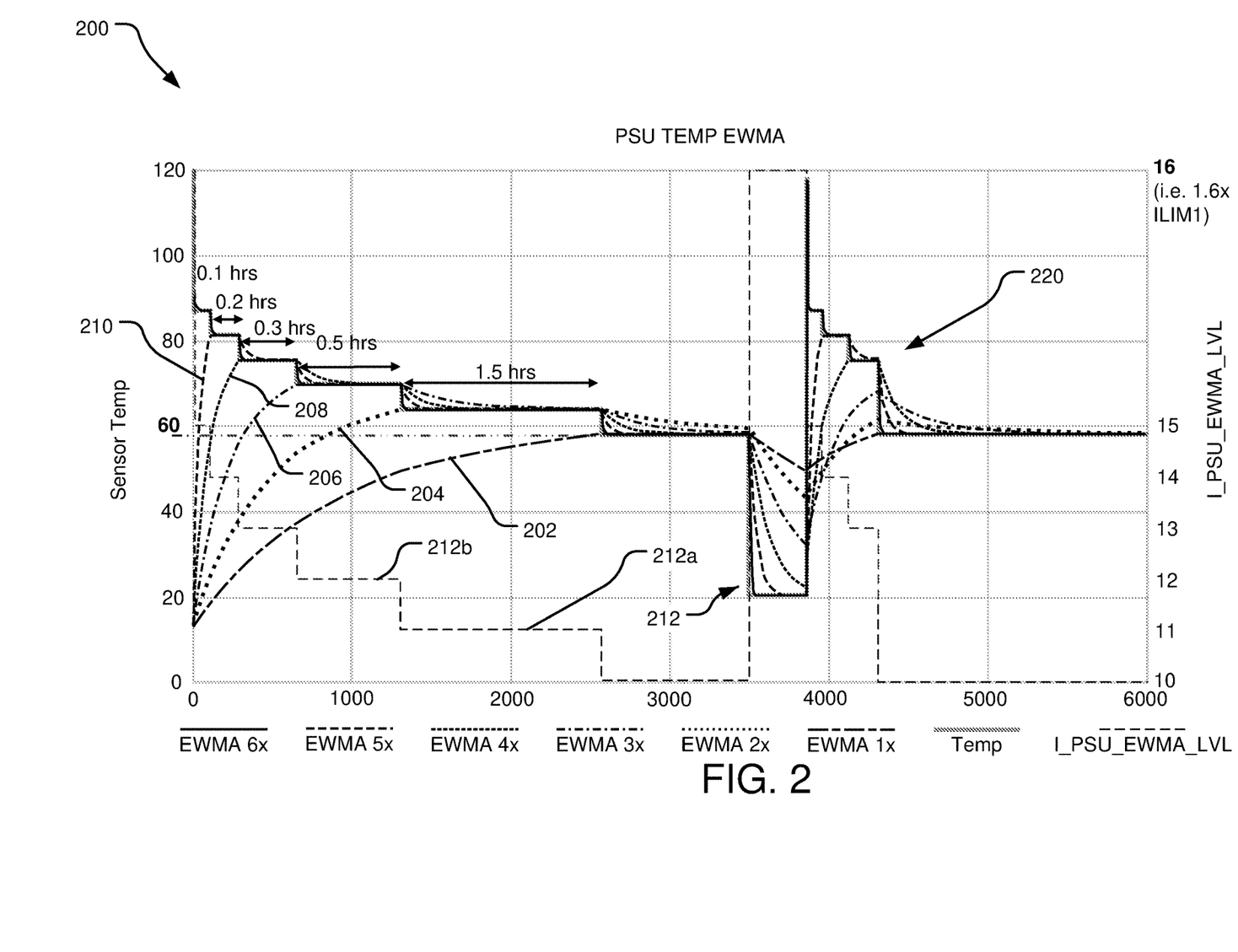
FIG. 2 illustrates an example graph of a PSU control method disclosed herein using measured temperature of the PSU.

FIG. 2 illustrates example graphs 200 of a PSU control method disclosed herein using multiple averages of a measured internal temperature of the PSU. Specifically, the graphs 200 include the actual measured internal temperature of the PSU, and individual graphs 202-210 each illustrating a different EWMA moving average of the internal temperature of the PSU, with time t in seconds shown on the x-axis. Each EWMA moving average has a predefined unique time constant Tau ($\tau$), where the Tau of graph 210 is smaller than Tau ($\tau$) of graph 208, which is shorter than Tau ($\tau$) of graph 206, which is shorter than Tau ($\tau$) of graph 204, etc. Each EWMA moving average 202-210 also has an associated temperature target. When an EWMA average reaches its' target, the control system will change to the I_PSU_EWMA_LVL with an associated level, as indicated with 212b, 212a, etc.

For example, at time of 1000 seconds the I_PSU_EWMA_LVL is already indicated to be at 212b, because the EWMA average of 206 has already reached its' threshold of 70 C. Once the EWMA average of 204 reaches its EWMA average of 65 C, the I_PSU_EWMA_LVL will switch to 212a. The period of operating at the I_PSU_EWMA_LVL of 212a can be as long as 1.5 hours, or until the EWMA average of 202 reaches 58 C, at which the I_PSU_EWMA_LVL will be reduced again.

Graph 220 also shows how the system can adaptively change the time duration of maximum allowed power level (i.e. I_PSU_EWMA_LVL) depending upon PSU power load profile. For example, if the load seen at the PSU reduces due to reduced system power demands as shown at time of 3500 seconds, but then resumes again at 3800 seconds, during that period of time each of the EWMA averages has reduced a different amount. As such, the time required to reach each target is again different, and the time allowed at higher I_PSU_EWMA_LVL levels is reduced. This is because the next lower EWMA threshold was reached earlier as the EWMA Tau ($\tau$) decays only shorter time and re-build EWMA up to each threshold. Adaptively changing the time duration of maximum allowed power level (i.e. I_PSU_EWMA_LVL) depending upon PSU power load profile in the manner disclosed in FIG. 2 mitigates PSU from getting over-stressed.

Figure 3:
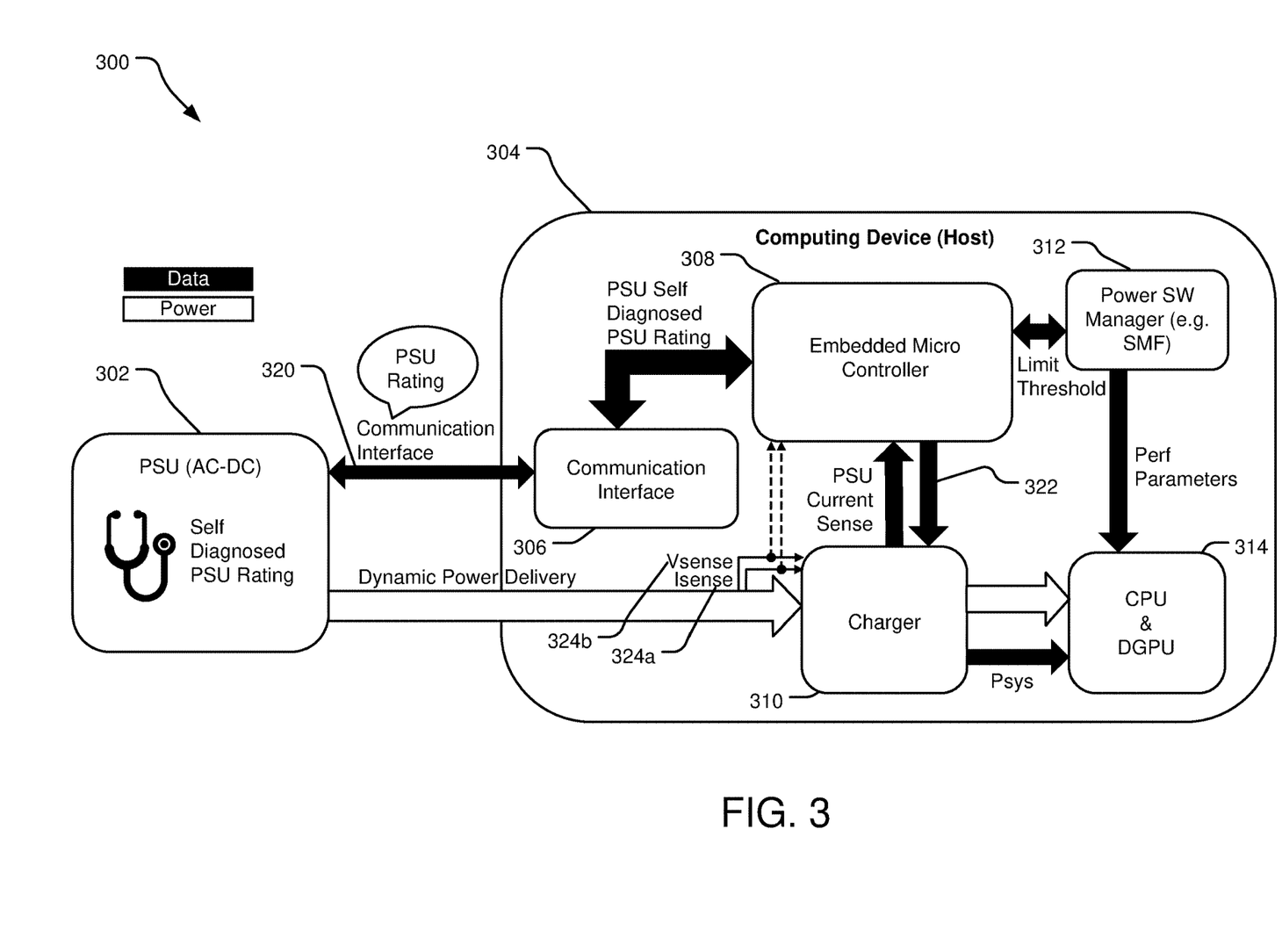
FIG. 3 illustrates an alternative example computing system including a PSU control system that adjusts output power based at least in part on initial power levels of the PSU.

FIG. 3 illustrates a PSU control system 300 that adjusts output power based at least in part on initial power levels of the PSU. The PSU control system 300 may be implemented on a computing device 304. In the illustrated implementation, the PSU control system 300 includes a communication link 320 that communicates between the PSU 302 and a communication interface 306 of the computing device 304. For example, the communication interface 306 may be a USB Type C power delivery (USBC PD) controller or a Microsoft Surflink communication interface. The communication link 320 may be used to receive the PSU rating of the PSU 302. The PSU 302 may provide power to a charger 310 of the computing device 304. In one implementation, a current sense component 324a may sense the current output from the PSU 302 and a voltage sensor 324b may sense the voltage output from the PSU 302, where the sensed current and the sensed voltage may be used to determine the power output from the PSU 302, also referred to as the sensed output power of the PSU 302.

Specifically, the communication interface 306 may communicate the sensed output power of the PSU 302 to an embedded microcontroller 308. The embedded microcontroller 308 may be configured to implement one or more algorithms for averaging sensed output power of the PSU 302 over different time durations and to dynamically generate a charger current limit 322. The charger current limit 322 may be communicated as an input to a charger 310 that provides current to a processor 314. For example, the processor 314 may be a CPU of the device 304, a dedicated GPU (DGPU) of the device 304, etc.

Furthermore, the embedded microcontroller 308 may also generate a limit threshold based at least in part on the sensed output power of the PSU and a timer and communicate the limit threshold to a processor power software manager such as an SMF 312. In one implementation, the SMF 312 use the limit thresholds to generate performance parameters, such as system and component level power caps, for the processor 314 that may throttle performance of the processor 314.

In one implementation, the embedded microcontroller 308 may receive and store the sensed output power of the PSU 302 over various time durations and generate weighted moving averages (WMAs) of the sensed power of the PSU 302 for the various time durations. For example, the embedded controller 308 may generate WMAs of the sensed output power of the PSU 302 over rolling durations of 0.1 hours, 0.2 hours, 0.3 hours, 0.5 hours, 1 hour, 1.5 hours, etc. In one implementation, the embedded microcontroller 308 may generate the WMA as exponential WMA for various time durations using the equation I provided below:

$$EWMA_t = EWMA_{t-1} + \Delta t/\tau * (I_t - EWMA_{t-1}) \qquad \mathrm{I}$$

Here $EWMA_t$ is the EWMA at time t, $EWMA_{t-1}$ is the EWMA at time t−1, $I_t$ is the sensed output power of the PSU 302 received from the communication interface 306 for time t, $\Delta t$ is the time elapsed between t−1 and t, and $\tau$ is the constant time duration related to the average. For example, $\tau$ may be 30 seconds, 60 seconds, 90 seconds, etc.

Furthermore, the embedded microcontroller 308 may also store a lookup table that stores EWMA output levels related to various time durations and power thresholds for the PSU 102. For example, if the calculated EWMA of the sensed output power of the PSU 302 for $\Delta t$ of 0.1 hours is above 1.5× PSU, the EWMA output level may be 15. Similarly, if the calculated EWMA of the sensed output power of the PSU 302 for Δt of 0.2 hours is above 1.4× PSU, the EWMA output level may be 14. Such dynamic current limit to the charger 110 allows the maximum power that can be applied to the processor 314 to be increased opportunistically or dynamically based at least in part on the sensed output power PSU 302. This provides a potential for faster charging of the device 304 and allows providing performance boost to the processor 314 and other peripherals (such as USB-C) of the device 304.

An example relations between the maximum time durations Δt, EWMA sensed power thresholds, and the EWMA output levels that determines the PSU power threshold is illustrated by the lookup Table II that may be stored in a memory of the embedded microcontroller 308.

LOOKUP TABLE II

| EWMA Output Level | Maximum Duration (Hours) | PSU Power Threshold (Isense × Vsense) | PSU Power Threshold (Charger Current ILIM1) |
|---|---|---|---|
| 16 | N/A | All EWMA < Thresholds | 1.6× |
| 15 | 0.1 | 1.5× PSU | 1.5× |
| 14 | 0.2 | 1.4× PSU | 1.4× |
| 13 | 0.3 | 1.3× PSU | 1.3× |
| 12 | 0.5 | 1.2× PSU | 1.2× |
| 11 | 1.5 | 1.15× PSU | 1.15× |
| 10 | Sustaining | 1× PSU | 1× |

Specifically, Lookup Table II illustrates using calculations of various EWMA based at least in part on sensed output power PSU 302 to dynamically adjust the PSU maximum power. Each EWMA has a uniquely designed time constant, referred to as Tau ($\tau$). During the operation, each individual EWMA for various Taus is correlated with a different PSU power threshold limits. For example, the EWMA for 60 second $\tau$ corresponds with a 1.2 PSU rating. Another EWMA for 30 second $\tau$ may correspond with 1.15× PSU rating.

Once one of the multiple simultaneously calculated EWMA reaches corresponding sensed power associated with a PSU power rating threshold, a target maximum flag is sent to a software or hardware control algorithm. Thus, for example, if the sensed power EWMA calculated for 60 second $\tau$ reaches 1.5× PSU such target maximum flag is sent to a software or hardware control algorithm. In response, the control algorithm throttles back the components in the platform such as CPU, DGPU, etc., to hold the desired PSU rating, in this case 1.5× PSU rating. Subsequently, when the next sensed power EWMA, for example, the EWMA for 30 second $\tau$ reaches 1.3× PSU, another flag is sent to the control algorithm and in response, the control algorithm further throttles back the components in the platform such as CPU, DGPU, etc., to hold the desired PSU rating, in this case 1.3× PSU rating.

This implementation allows for a gradual step-down approach to limit PSU power rating. Specifically, in order for the higher PSU power rating to be available again requires operation periods at lower power level (i.e. lower PSU temperature) to give the EWMAs time to reduce in their value. The disclosed implementations allow dynamically using higher PSU ratings for applications like games where higher frame-per-second (FPS) rate may be provided using higher PSU power rating than prior fixed PSU rating levels with less component throttling, but still within time-duration based limits at the various PSU power rating.

Figure 4:
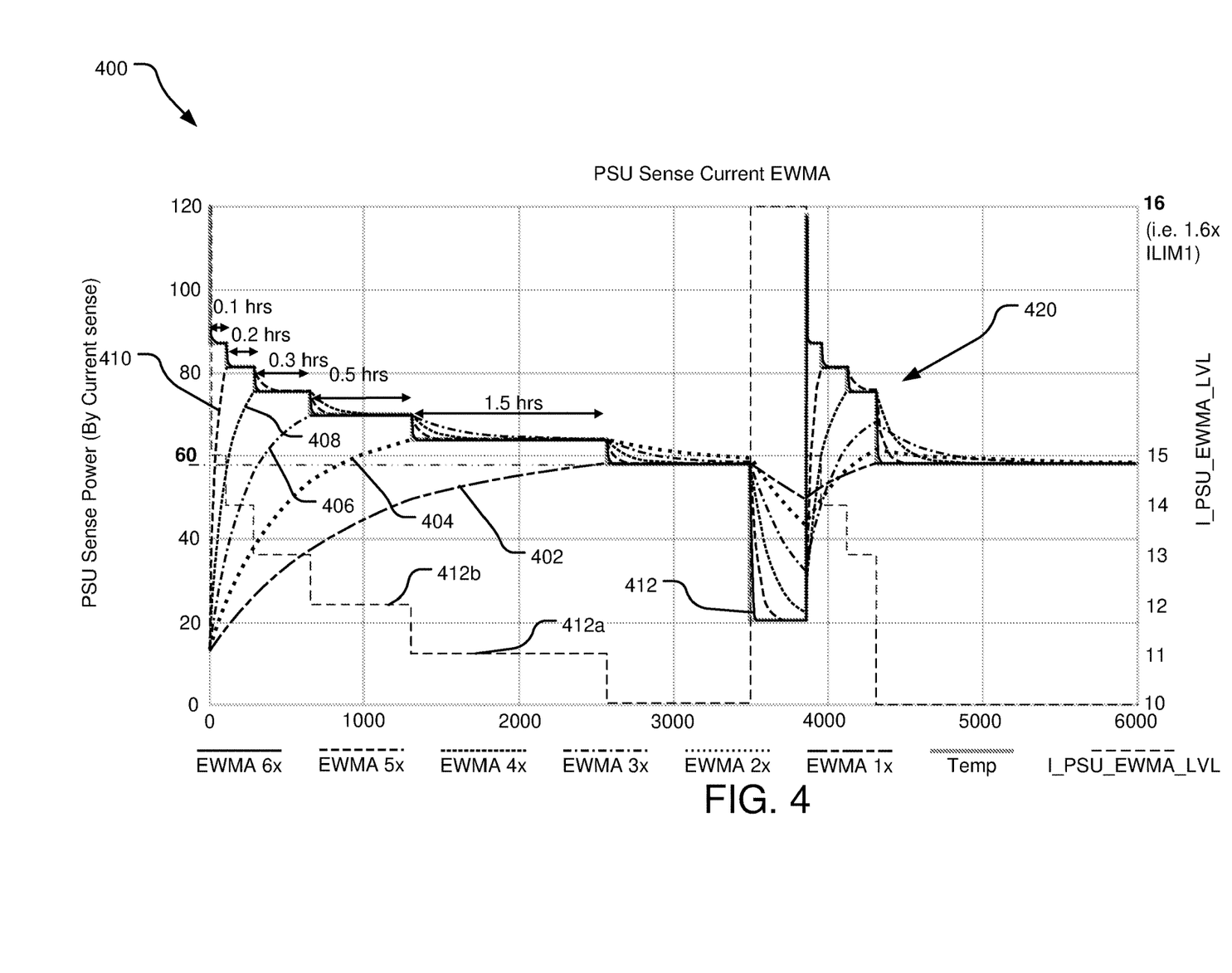
FIG. 4 illustrates an alternative example graph of a PSU control method disclosed herein using initial power levels of the PSU.

FIG. 4 illustrates example graphs 400 of a PSU control method disclosed herein using sensed output power of a PSU. Specifically, the graphs 400 include individual graphs 402-410, each illustrating the relation between the calculated PSU output power EWMA with a defined time constant Tau ($\tau$) on the y-axis and time t on the x-axis. A time constant is designed per each graph from 402 to 410 such that maximum sustainable power level (I_PSU_EWMA_LVL) is established in-between two EWMA thresholds.

For example, as per graph 404, which measures its' own EWMA with a defined tau (time constant) in parallel with other EWMA graphs. Once 404 EWMA reaches a corresponding threshold of temperature, the maximum sustaining PSU power level (i.e. I_PSU_EWMA_LVL, e.g. 1.15× PSU) is allowed up to 1.5 hours until 202 EWMA reaches next lower level threshold. If the calculated EWMA is above 70 Watt, charger current limit ILIM1 is set such that PSU power is at 1.15× (y-axis on the right) as shown by 412a.

Similarly, as per graph 406, which measures EWMA with own Tau ($\tau$) and reaches threshold temperature, I_PSU_EWMA_LVL is set to 412b and allowed maximum continuous time durations of 0.5 hours until next EWMA reaches its threshold. Graphs 402, 408, and 410 illustrate, respectively, Graphs 402, 408, and 410 illustrate, respectively, if the calculated EWMA of sensed output power is above, charger current limit ILIM1 is set to 1.15× (y-axis on the right) as shown by 412a.

Graph 420 shows how adaptively change time duration of maximum allowed power level (i.e. I_PSU_EWMA_LVL) depending upon PSU power load profile. As PSU load 412 lowers such short time duration in the example, soon the next higher PSU peak power is allowed shorter time duration of each I_PSU_EWMA_LVL thresholds. This is because next lower EWMA threshold was reached earlier as the EWMA tau decays only shorter time and re-build EWMA up to each threshold. Adaptively changing the time duration of maximum allowed power level (i.e. I_PSU_EWMA_LVL) depending upon PSU power load profile in the manner disclosed in FIG. 4 mitigates PSU from getting over-stressed.

Figure 5:
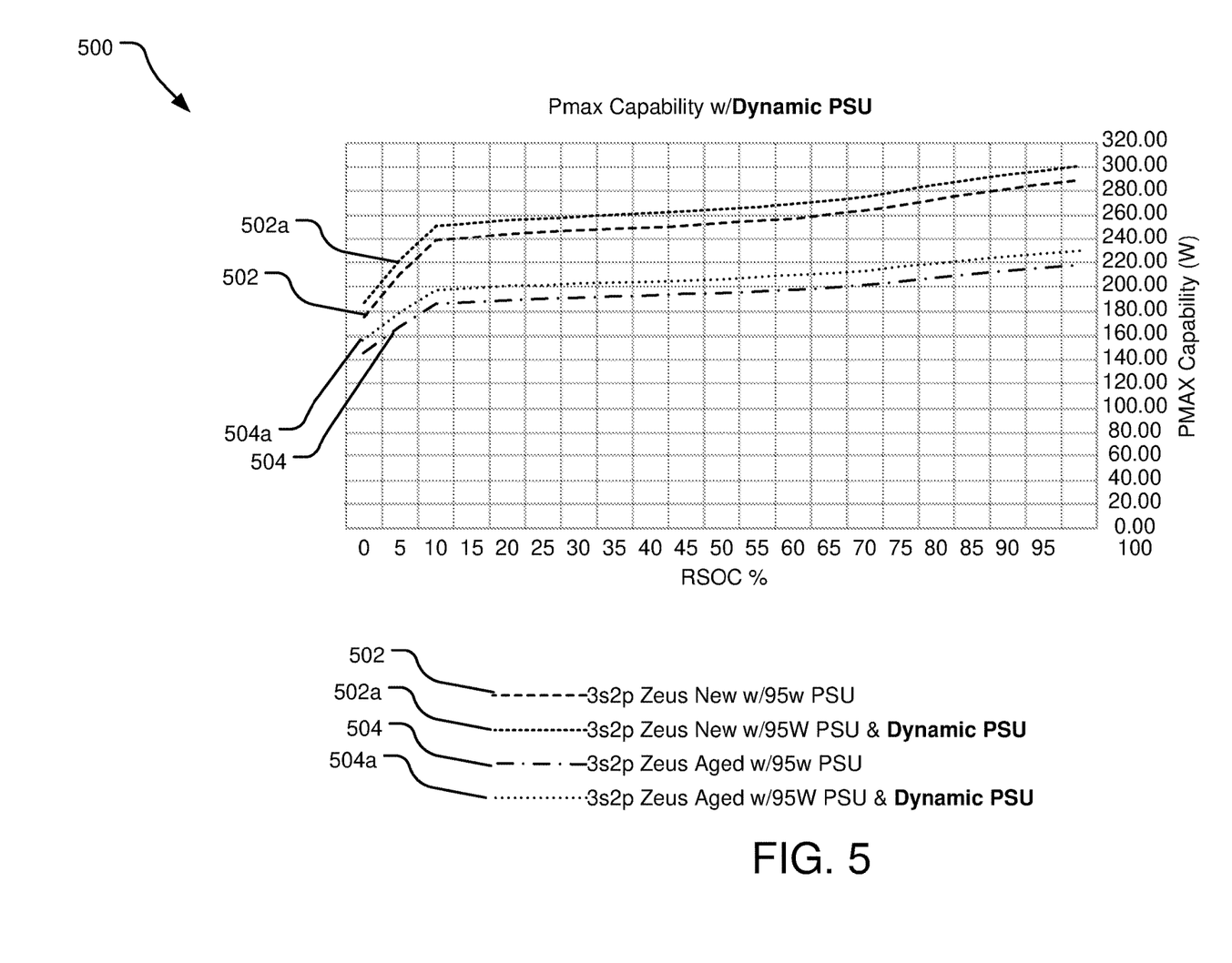
FIG. 5 illustrates an example graph of performance boost achieved using the PSU control system disclosed herein.

FIG. 5 illustrates example graphs 500 of performance boost achieved using the PSU control system disclosed herein. Specifically, graphs 500 illustrate maximum power capabilities (PMAX) on the y-axis at various relative state-of-charge (RSOC) percentages for device battery with and without dynamic PSU system disclosed herein. For example, graph 502 illustrates the PMAX capability for the 3s2p Zeus New w/95w PSU that does not have dynamic PSU disclosed herein, whereas a graph 502a illustrates the PMAX capability for the 3s2p Zeus New w/95w PSU that has the dynamic PSU disclosed herein. As seen herein, for each values of the RSOC %, the PMAX capability for the device with dynamic PSU is higher.

Similarly, graph 504 illustrates the PMAX capability for the 3s2p Zeus Aged w/95w PSU that does not have dynamic PSU disclosed herein, whereas a graph 504a illustrates the PMAX capability for the 3s2p Zeus Aged w/95w PSU that has the dynamic PSU disclosed herein. As seen herein, for each values of the RSOC %, the PMAX capability for the device with dynamic PSU is higher.

Figure 6:
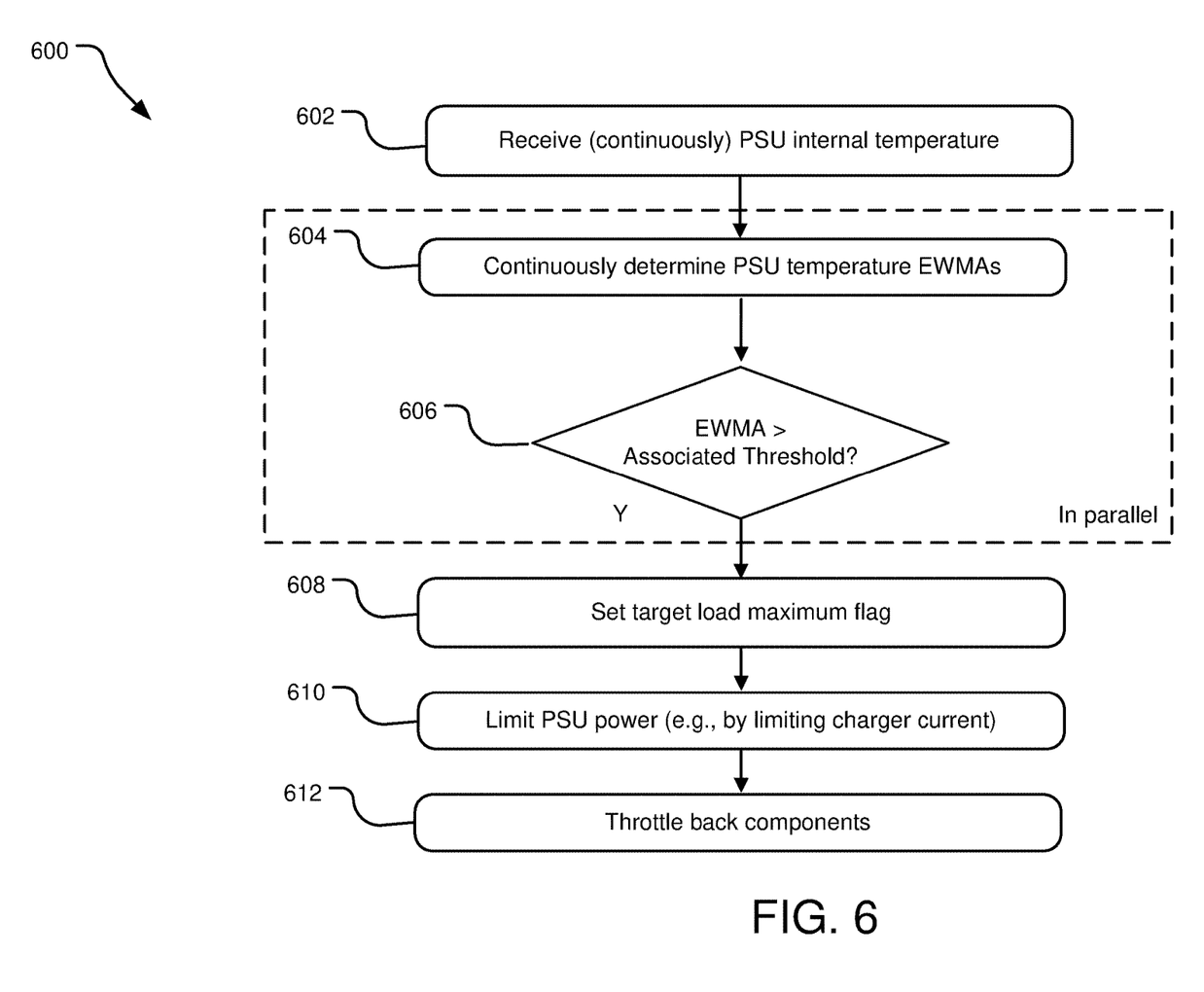
FIG. 6 illustrates example operations of the PSU control system disclosed herein.

FIG. 6 illustrates operations 600 of the PSU control system disclosed herein. One or more of the operations 600 may be implemented on an embedded controller of a computing device, such as the embedded micro controller 108 disclosed in FIG. 1. An operation 602 receives internal temperature of a PSU. Specifically, the operation 602 may receive the internal temperature of the PSU over a duration of time on a continuous basis. Specifically, the operation 602 receives PSU internal temperatures continuously at predetermined time intervals.

Operations 604 and 606 run in parallel to continuously determine PSU temperature EWMAs and to determine if any of the determined PSU temperature EWMAs exceed a threshold associated therewith. Thus, the operation 604 continuously EWMAs of the internal temperature of the PSU for the duration of time. For example, the operation 604 may determine the EWMAs using the equation I disclosed above with respect to FIG. 1. Specifically, the operation 604 is configured to determine multiple EWMAs, each of the multiple EWMAs correlated to average constant time duration, referred to as Tau ($\tau$). For example, the operation 604 may determine an internal temperature EWMA for 60 second Tau ($\tau$), an internal temperature EWMA for 30 second Tau ($\tau$), etc.

The operation 606, running in parallel with the determining operation 604, determines if any of the PSU temperature EWMAs exceed a threshold associated therewith. Such temperature thresholds may be stored in a lookup table in memory of a computing device. For example, the temperature threshold associated with $\tau$ of 60 second may be 80 C, the temperature threshold associated with $\tau$ of 30 second may be 70 C, etc. If operation 606 determines that the calculated value of the EWMA for one of the multiple EWMAs is higher than the temperature threshold associated with its corresponding Tau ($\tau$), an operation 608 sets a target load maximum flag. Alternatively, operation 608 may communicate the target load maximum flag to a power software manager, such as the SMF 112.

Also, an operation 610 limits the PSU power provided to the device components, such as the CPU, the DGPU, etc. For example, the operation 610 limits the PSU power by limiting the charger current to a charger providing power to the device components. Furthermore, based at least in part on receiving the target load maximum flag, at operation 612 the power software manager may throttle back components in the computing device, such as the CPU, the DGPU, etc., in order to hold the desired PSU rating associated with the Tau ($\tau$). The operations 606 to 612 may be repeated when the next EWMA, for example, the EWMA for 30 second $\tau$ reaches its temperature threshold, which may be 70 C. The dynamic throttling of the components based at least in part on calculated PSU internal temperature EWMAs allows providing higher PSU ratings for applications such as gaming while also allowing for gradual step-down to limit the PSU power rating.

Figure 7:
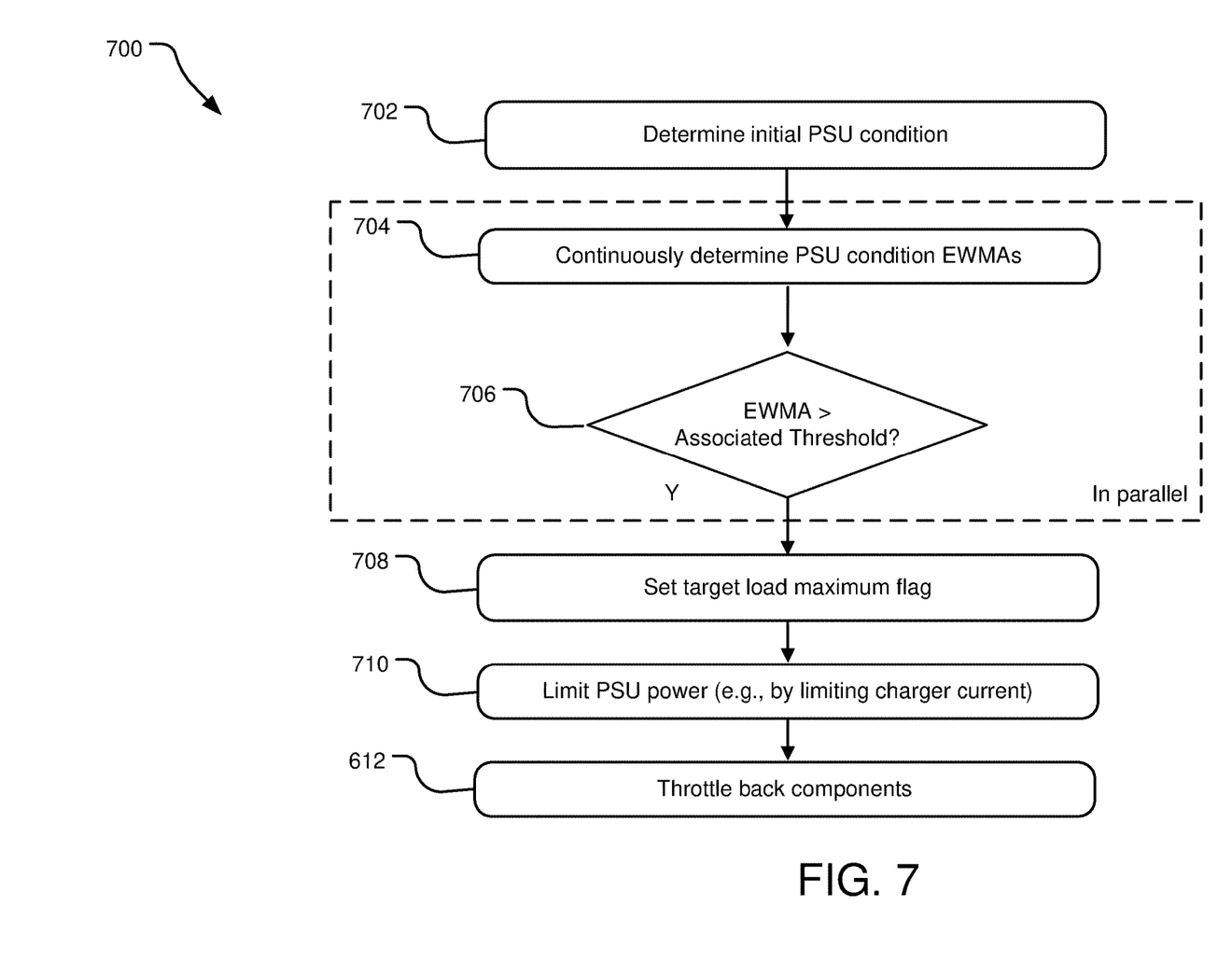
FIG. 7 illustrates alternative example operations of the PSU control system disclosed herein.

FIG. 7 illustrates alternative operations 700 of the PSU control system disclosed herein. One or more of the operations 700 may be implemented on an embedded controller of a computing device, such as the embedded micro controller 308 disclosed in FIG. 3. An operation 702 determines an initial condition of a PSU. As an example, the initial condition may be PSU internal temperature, power capability of the PSU, etc. For example, the operation 702 may determine the power output level of a PSU based at least in part on PSU internal status report based upon PSU temperature.

Operations 704 and 706 run in parallel to continuously determine PSU condition EWMAs and to determine if any of the determined initial PSU condition EWMAs exceed a threshold associated therewith. Thus, the operation 704 continuously determines EWMAs of the internal PSU condition for the duration of time. For example, the operation 704 may determine the EWMAs using the equation I disclosed above with respect to FIG. 3. Specifically, the operation 704 is configured to determine multiple EWMAs, each of the multiple EWMAs correlated to average constant time duration, referred to as Tau ($\tau$). For example, the operation 704 may determine an initial PSU condition EWMA for 60 second Tau ($\tau$), an initial PSU condition EWMA for 30 second Tau ($\tau$), etc. In one implementation, the initial PSU condition may be the power output level of a PSU based at least in part on PSU internal status report based upon PSU temperature. As an example, based upon PSU temperature, PSU initial rating may be 1.2× only for only 0.5 hours, instead 1.6×.

The operation 706, running in parallel with the determining operation 704, determines if any of the initial PSU condition EWMAs, such as calculated value of the sensed output power EWMAs, exceed a threshold associated therewith. Such initial PSU condition thresholds may be stored in a lookup table in memory of a computing device. For example, if initial PSU condition is sensed output power, the threshold associated with $\tau$ of 60 second may be 1.5× PSU, the PSU threshold associated with $\tau$ of 30 second may be 1.4× PSU, etc. If operation 706 determines that the calculated value of the EWMA for one of the multiple EWMAs is higher than the initial PSU condition threshold associated with its corresponding Tau ($\tau$), an operation 708 sets a target load maximum flag. Alternatively, operation 708 may communicate the target load maximum flag to a power software manager, such as the service management facility (SMF) 312.

Also, an operation 710 limits the PSU power provided to the device components, such as the CPU, the DGPU, etc. For example, the operation 710 limits the PSU power by limiting the charger current to a charger providing power to the device components. Furthermore, based at least in part on receiving the target load maximum flag, at operation 712 the power software manager may throttle back components in the computing device, such as the CPU, the DGPU, etc., in order to hold the desired PSU rating associated with the Tau ($\tau$). The operations 706 to 712 may be repeated when the next EWMA, for example, the EWMA for 30 second $\tau$ reaches its dynamic PSU condition threshold by EWMA, which may be 1.5× PSU. The dynamic throttling of the components based at least in part on calculated PSU condition EWMAs, such as sensed PSU output level, allows providing higher PSU ratings for applications such as gaming while also allowing for gradual step-down to limit the PSU power rating.

Figure 8:
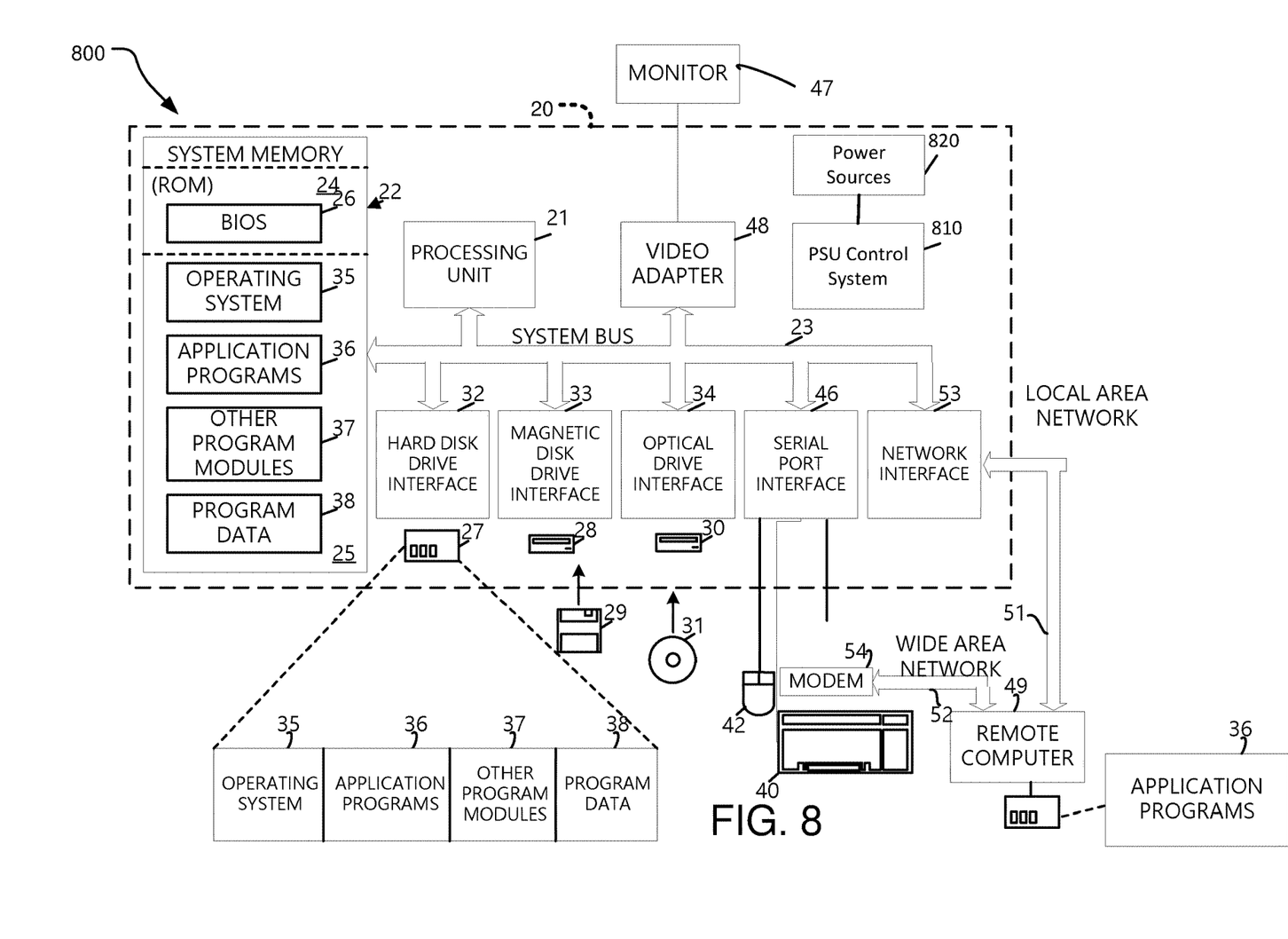
FIG. 8 illustrates an example system that may be useful in implementing the battery pack control system disclosed herein.

FIG. 8 illustrates an example system 800 that may be useful in implementing the battery pack control system disclosed herein. The example hardware and operating environment of FIG. 8 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 800, the computer 20 also includes a PSU control system 810, such as the battery pack control system disclosed herein. The PSU control system 810 may communicate with power sources 820 to control the level of power provided by the power sources 820.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a battery pack control system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 8. Similarly, instructions stored on the memory of the computer 20 may also be used to implement one or more operations of FIG. 4. The memory of the computer 20 may also one or more instructions to implement the battery pack control system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 8 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the PSU control system 810 may be stored in system memory 22 and/or storage devices 29 or 31 and processed by the processing unit 21. Battery pack control system scheme and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of battery pack control system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The PSU control system disclosed herein may include a variety of tangible computer-readable storage media and intangible computer-readable communication signals. Tangible computer-readable storage can be embodied by any available media that can be accessed by the battery pack control system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the battery pack control system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation disclosed herein provides an apparatus including a power supply unit (PSU) and a PSU control system stored in the memory and executable by the one or more processor units, the PSU control system encoding computer-executable instructions on the memory for executing on the one or more processor units a computer process, the computer process including receiving internal temperatures of the PSU over a duration of time, determining multiple exponential weighted moving average (EWMAs) of the internal temperature of the PSU for the duration of time, comparing the EWMA with a temperature threshold associated with the duration of time, and based at least in part on determining that EWMA exceeds the temperature threshold associated with the duration of time, limiting the output power of a charger using a charger current limit input to the charger. In an alternative implementation of the technology disclosed herein, the computer process includes receiving an initial condition of the PSU such as sensed PSU power level for a duration of time, determining multiple EWMA of the sensed PSU power level for the duration of time, comparing the EWMA with a sensed power level threshold associated with the duration of time, and based at least in part on determining that EWMA exceeds the sensed power level threshold associated with the duration of time, limiting the output power of a charger using a charger current limit input to the charger.

An alternative implementation discloses One or more physically manufactured computer-readable storage media, encoding computer-executable instructions for executing on a computer system a computer process, the computer process including receiving internal temperatures of the PSU over a duration of time, determining an exponential weighted moving averages (EWMA) of the internal temperature of the PSU for the duration of time, comparing the EWMA with a temperature threshold associated with the duration of time, and based at least in part on determining that EWMA exceeds the temperature threshold associated with the duration of time, limiting the output power of a charger using a charger current limit input to the charger and setting a target load maximum flag.

A method disclosed herein includes receiving internal temperatures of the PSU over a duration of time, determining an exponential weighted moving averages (EWMA) of the internal temperature of the PSU for the duration of time, comparing the EWMA with a temperature threshold associated with the duration of time, and based at least in part on determining that EWMA exceeds the temperature threshold associated with the duration of time, limiting the output power of a charger using a charger current limit input to the charger and setting a target load maximum flag.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A device, comprising:
   memory;
   one or more processor units;
   a power supply unit (PSU);
   a PSU control system stored in the memory and executable by the one or more processor units, the PSU control system encoding computer-executable instructions on the memory for executing on the one or more processor units a computer process, the computer process comprising:
   determining an initial PSU power level at a startup of the device;

limiting an output power of a charger using a charger current limit input to the charger and determined based at least in part on the initial PSU power level at the startup of the device;
receiving internal temperatures of the PSU over a duration of time;
determining multiple exponential weighted moving average (EWMAs) of the internal temperature of the PSU for the duration of time;
comparing the EWMAs with temperature thresholds associated with the duration of time; and
based at least in part on determining that EWMA exceeds the temperature threshold associated with the duration of time, limiting the output power of a charger using the charger current limit input to the charger.

2. The device of claim 1, wherein determining the multiple EWMAs of the internal temperature of the PSU for the duration of time further comprising determining each of the multiple EWMAs of the internal temperature of the PSU associated with a duration of time different than a time duration associated with another of the multiple EWMAs.

3. The device of claim 2, wherein the computer-executable instructions further comprising determining a plurality of EWMAs of the internal temperature of the PSU for a plurality of time durations.

4. The device of claim 3, wherein the computer-executable instructions further comprising storing a temperature threshold lookup table in the memory, the temperature threshold lookup table including a plurality of EWMA thresholds and a plurality of charger current limit, each of the plurality of charger current limit related to a combination of one of the plurality of time durations and one of the plurality of EWMA thresholds.

5. The device of claim 2, wherein the computer-executable instructions further comprising:
based at least in part on determining that EWMA exceeds the temperature threshold associated with the duration of time, setting a target load maximum flag; and
throttling back operation of one or more component of the device.

6. The device of claim 1, wherein determining the initial PSU power level at the startup of the device further comprising determining the initial PSU power level based at least in part on self-diagnosis by the PSU or based on the initial temperature of the PSU at plug-in.

7. The device of claim 6, wherein the computer-executable instructions further comprising storing a PSU sensed output threshold lookup table in the memory, the PSU sensed output threshold lookup table including a plurality of PSU power levels, a plurality of charger current limits, and a plurality of time durations, each of the plurality of charger current limits related to a combination of one of the plurality of time durations and one of the plurality of PSU power levels.

8. A method comprising:
determining an initial PSU power level at a startup of the device;
limiting an output power of a charger using a charger current limit input to the charger and determined based at least in part on the initial PSU power level at the startup of the device;
receiving internal temperatures of a power supply unit (PSU) over a duration of time;
determining an exponential weighted moving averages (EWMA) of the internal temperature of the PSU for the duration of time;
comparing the EWMA with a temperature threshold associated with the duration of time; and
based at least in part on determining that EWMA exceeds the temperature threshold associated with the duration of time, limiting the output power of a charger using the charger current limit input to the charger.

9. The method of claim 8, wherein determining the multiple EWMAs of the internal temperature of the PSU for the duration of time further comprising determining each of the multiple EWMAs of the internal temperature of the PSU associated with a duration of time different than a time duration associated with another of the multiple EWMAs.

10. The method of claim 9, further comprising determining a plurality of EWMAs of the internal temperature of the PSU for a plurality of time durations.

11. The method of claim 10, further comprising storing a temperature threshold lookup table in the memory, the temperature threshold lookup table including a plurality of EWMA thresholds and a plurality of charger current limit, each of the plurality of charger current limit related to a combination of one of the plurality of time durations and one of the plurality of EWMA thresholds.

12. The method of claim 11, further comprising comparing an EWMA threshold associated with a given time duration with a calculated EWMA for the given time duration and based at least in part on determining that the calculated EWMA for the given time duration exceeds the EWMA threshold associated with the given time duration:
limiting the charger current to the charger current limit related the given time duration in the temperature threshold lookup table;
setting a target load maximum flag; and
throttling back operation of one or more component of the device.

13. The method of claim 8, wherein determining the initial PSU power level at the startup of the device further comprising receiving a PSU input current from a current sensor and multiplying the PSU input current with the PSU voltage level.

14. The method of claim 8, further comprising storing a PSU sensed output threshold lookup table in the memory, the PSU sensed output threshold lookup table including a plurality of PSU power levels, a plurality of charger current limits, and a plurality of time durations, each of the plurality of charger current limits related to a combination of one of the plurality of time durations and one of the plurality of PSU power levels.

15. One or more tangible physically manufactured computer-readable storage media, encoding computer-executable instructions for executing on a computer system a computer process, the computer process comprising:
determining an initial PSU power level at a startup of the device;
limiting an output power of a charger using a charger current limit input to the charger and determined based at least in part on the initial PSU power level at the startup of the device;
receiving internal temperatures of the PSU over a duration of time;
determining an exponential weighted moving averages (EWMA) of the internal temperature of the PSU for the duration of time;
comparing the EWMA with a temperature threshold associated with the duration of time; and
based at least in part on determining that EWMA exceeds the temperature threshold associated with the duration of time, limiting the output power of a charger using the charger current limit input to the charger and setting a target load maximum flag.

16. The one or more tangible physically manufactured computer-readable storage media of claim 15, wherein determining the multiple EWMAs of the internal temperature of the PSU for the duration of time further comprising determining each of the multiple EWMAs of the internal temperature of the PSU associated with a duration of time different than a time duration associated with another of the multiple EWMAs.

17. The one or more tangible physically manufactured computer-readable storage media of claim 16, wherein the computer-executable instructions further comprising determining a plurality of EWMAs of the internal temperature of the PSU for a plurality of time durations.

18. The one or more tangible physically manufactured computer-readable storage media of claim 16, wherein the computer-executable instructions further comprising:

storing a temperature threshold lookup table in the memory, the temperature threshold lookup table including a plurality of EWMA thresholds and a plurality of charger current limit, each of the plurality of charger current limit related to a combination of one of the plurality of time durations and one of the plurality of EWMA thresholds;

comparing an EWMA threshold associated with a given time duration with a calculated EWMA for the given time duration; and based at least in part on determining that the calculated EWMA for the given time duration exceeds the EWMA threshold associated with the given time duration, limiting the charger current to the charger current limit related the given time duration in the temperature threshold lookup table.

* * * * *